United States Patent [19]

Moore et al.

[11] 4,287,818

[45] Sep. 8, 1981

[54] AUTOMATIC FRYER FOR BREADED PRODUCTS

[75] Inventors: Lewis F. Moore; George M. Price, both of Shreveport, La.

[73] Assignee: The Frymaster Corporation, Shreveport, La.

[21] Appl. No.: 953,910

[22] Filed: Oct. 23, 1978

[51] Int. Cl.[3] ............................................. A47J 37/12
[52] U.S. Cl. ....................................... 99/355; 99/336; 99/407; 99/411; 99/416
[58] Field of Search ................. 99/336, 407, 410, 411, 99/416, 417, 443 R, 448, 355, 408

[56] References Cited

U.S. PATENT DOCUMENTS

| | | | |
|---|---|---|---|
| 1,277,158 | 8/1918 | Wall | 99/336 X |
| 3,364,845 | 1/1968 | Wilson | 99/407 X |
| 3,430,553 | 3/1969 | Di Pietro | 99/336 |
| 3,431,834 | 3/1969 | Keathley | 99/411 X |
| 3,563,158 | 2/1971 | Omer | 99/407 |
| 3,635,722 | 1/1972 | Moore | 99/407 X |
| 3,797,377 | 3/1974 | Lotter | 99/407 |
| 3,958,503 | 5/1976 | Moore | 99/336 X |
| 3,964,378 | 6/1976 | Dunkelman | 99/407 X |
| 4,031,820 | 6/1977 | Reed | 99/407 X |
| 4,064,796 | 12/1977 | Jones | 99/448 X |

*Primary Examiner*—Billy J. Wilhite

*Attorney, Agent, or Firm*—Hubbard, Thurman, Turner, Tucker & Glaser

[57] ABSTRACT

Frying apparatus including a fry pot and rack handling means for inserting a vertical stack of frying racks into and withdrawing the frying racks from the fry pot is disclosed. The rack handling means includes a frying rack assembly and a rack support assembly movably suspended with respect to the open mouth of the fry pot. The rack support assembly includes portions defining an open channel detachably engaging the frying rack assembly and means for guiding the frying rack assembly for movement from an elevated position above the open mouth of the fry pot wherein the frying rack assembly may be inserted into the channel prior to a cooking cycle or withdrawn from the channel after completion of the cooking cycle, to an immersed position inside of the fry pot wherein food portions previously loaded onto the frying rack assembly may be fried during a cooking cycle. In a preferred embodiment, the frying rack assembly comprises an open basket frame and a plurality of frying racks stacked in vertical relation within the basket frame, and the rack support assembly comprises a pair of support arms pivotally coupled to the frying rack assembly defining a pantograph structure which stabilizes the movement of the frying rack assembly as it is inserted into or withdrawn from the fry pot.

13 Claims, 7 Drawing Figures

AUTOMATIC FRYER FOR BREADED PRODUCTS

BACKGROUND OF THE INVENTION

1. Field of the Invention

The present invention relates to apparatus for deep fat frying, and more particularly to apparatus for transferring bulk quantities of breaded food portions into and out of a fry pot.

2. Description of the Prior Art

Modern convenience restaurants feature rapid service for prepared foods such as fried chicken, fish and potatoes. According to the conventional method for frying of breaded food products such as chicken, approximately 75 pounds of frying shortening are required to cook ten pounds of chicken. The chicken is typically cut in either eight or nine pieces per head. The chicken is then breaded and loaded directly into the shortening by hand, with the loading time being from 90 to 120 seconds. The first product loaded has substantially longer cooking time than the final product loaded, requiring the exercise of judgment on part of the operator as to which pieces are loaded first, as well as speed and dexterity to insure that the loading time is minimized. After the frying cycle is completed, the pieces of chicken are removed using a previously submerged screen rack with handles which brings all the pieces out simultaneously, or the pieces are scooped out at a rate of one or two pieces at a time by means of a scoop having a perforated screen mounted on a handle, or the pieces may be removed by tongs. In each of these methods, the fried product may be damaged either by accidentally stacking the pieces on top of one another, or by abrasion or squeezing when the product is removed. If the fried product is removed one piece at a time, substantial unloading time is required which causes a variation in the cooking time if all the pieces are not removed simultaneously.

After the fried product is removed in the conventional system, it must be carefully placed in an orderly manner on some type of screen to allow draining to be completed. It is common practice to place the screen and products on a tray and transfer the tray to a warming cabinet for holding until the product is sold or served.

One problem associated with the conventional method of frying breaded food products is the preservation of the cooking oil, which is relatively expensive. A significant factor which degrades the quality of the cooking oil is aeration or oxidation of the cooking oil. The rate at which the cooking oil becomes aerated is directly related to the surface area of the pool of cooking oil which is exposed to the atmosphere, which is equal to the cross-sectional area of the open mouth of the fry pot. For a conventional fry pot unit having the capacity to cook ten pounds of chicken, the surface area or fry pot mouth cross-sectional area normally provided is typically 18 inches by 18 inches (324 square inches). Therefore it would be desirable to provide apparatus for processing the same amount of chicken with relatively less surface area of cooking oil exposed to the atmosphere.

Another problem associated with the conventional method for cooking breaded food products is the risk of burn injury. Because the cooking oil may be extremely hot, for example 350° F. or higher, the operator and his co-workers are exposed to the risk of serious burn injury from the inadvertent or accidental splashing of hot cooking oil as the fried products are manually inserted into or removed from the fry pot. In some consoles in which fry pots are located side-by-side, the cooking cycle on an adjacent fryer must sometimes be interrupted to avoid exposing co-workers to the risk of being burned by splashing or splattering of cooking oil as the food portions are manually loaded or unloaded. The cost for such a delay is substantial, particularly in fast service restaurants. Therefore it would be desirable to provide apparatus in which the insertion and removal of breaded products can be accomplished automatically without exposing the operator or his co-workers to the risk of burn injury and without delaying operations in adjacent fry pots.

When frying breaded food products in bulk quantities according to conventional techniques, the individual breaded portions are manually inserted into the fry pot at the start of the cooking cycle which may take up to two minutes. They are withdrawn manually as discussed above. It is not practicable to insure uniform cooking time for each piece of breaded food product when the food products are inserted and withdrawn manually. This variation in cooking time causes a variation in the quality of the fried product, usually resulting in some pieces being overcooked or burned. This also impairs the quality of the cooking oil because the amount of food particles and bread particles which become suspended in the pool of oil is generally proportional to the length of time that the breaded food products remain in the oil. The presence of food particles in the cooking oil causes it to smoke, impairs the heat transfer efficiency of the oil and imparts a disagreeable flavor to the food portions. Therefore it is desirable to minimize the length of time that the food products are actually in the cooking oil. By minimizing the cooking time, the amount of energy required to heat the cooling oil is also minimized, and a more rigid turnover of prepared food products can be carried out in response to increased demand.

SUMMARY OF THE INVENTION

The present invention comprises a simplified and automated system for processing bulk quantities of food portions such as chicken and fish which are typically breaded and served at convenience restaurants. The present system provides for simple and efficient loading and unloading of previously prepared breaded food portions utilizing frying and handling apparatus in a relatively compact area. The food portions are automatically inserted into and withdrawn from a fry pot in a bulk handling operation which insures uniform cooking of each piece without separate handling of individual pieces regardless of whether the fry pot is fully loaded or not, and by minimizing energy consumption and preserving the quality of the cooking oil by reducing the effective surface area of the cooking oil which is exposed to the atmosphere while also minimizing the risk to co-workers of burn injuries related to splashing of cooking oil associated with conventional loading and unloading procedures.

In accordance with a broad aspect of the invention, frying apparatus including a fry pot and rack handling means for inserting a vertical stack of frying racks into and withdrawing the frying racks from the fry pot is disclosed. The rack handling means includes a frying rack assembly and a rack support assembly movably suspended with respect to the open mouth of the fry pot. The rack support assembly includes portions defining an open channel detachably engaging the frying rack assembly and means for guiding the frying rack assembly for movement from an elevated position above the open mouth of the fry pot wherein the frying rack assembly may be inserted into the channel prior to a cooking cycle or withdrawn from the channel after completion of the cooking cycle, to an immersed position inside of the fry pot wherein food portions previously loaded onto the frying rack assembly may be fried during a cooking cycle.

In a preferred embodiment, the frying rack assembly comprises a basket frame and a plurality of frying racks stacked in vertical relation within the basket frame, and the rack support assembly comprises a pair of support arms pivotally coupled to the frying rack assembly defining a pantograph structure which stabilizes the movement of the frying rack assembly as it is inserted into or withdrawn from the fry pot. According to this arrangement, a number of previously cut and breaded uncooked portions of food may be arranged onto frying racks and stored in a refrigerated compartment during a slack time period until they are needed. With the rack handling apparatus of the present invention, the frying racks may be stacked vertically within a basket frame which is removably detachable to the open channel of the rack support assembly.

The prearranged racks of food portions are stored in the refrigerator compartment until they are needed. At that time they are transported to a cooking console having a fry pot and the rack handling apparatus of the invention. The previously arranged stack of frying racks is suspended above the open mouth of the fry pot by inserting a latching portion of the basket frame into engagement with the open channel of the rack support assembly. Thereafter, the vertical stack of loaded frying racks together with the food portions are immersed in a pool of hot cooking oil in the fry pot by a pantograph support structure which stabilizes the movement of the frying rack assembly as it is inserted into or withdrawn from the fry pot. According to this arrangement, all of the food portions are immersed in the hot cooking oil at substantially the same time and therefore undergo the same amount of cooking so that quality can be closely controlled. After the end of the cooking cycle the basket frame together with the stacked frying racks are withdrawn from the fry pot by the pantograph assembly and are transported to a warming cabinet where they are stored until they are sold or served.

The foregoing and other objects, advantages and features of the invention will hereinafter appear, and for purposes of illustration, but not of limitation, an exemplary embodiment of the subject invention is shown in the appended drawing.

DETAILED DESCRIPTION OF THE PREFERRED EMBODIMENTS

Figures 1, 2, 7:
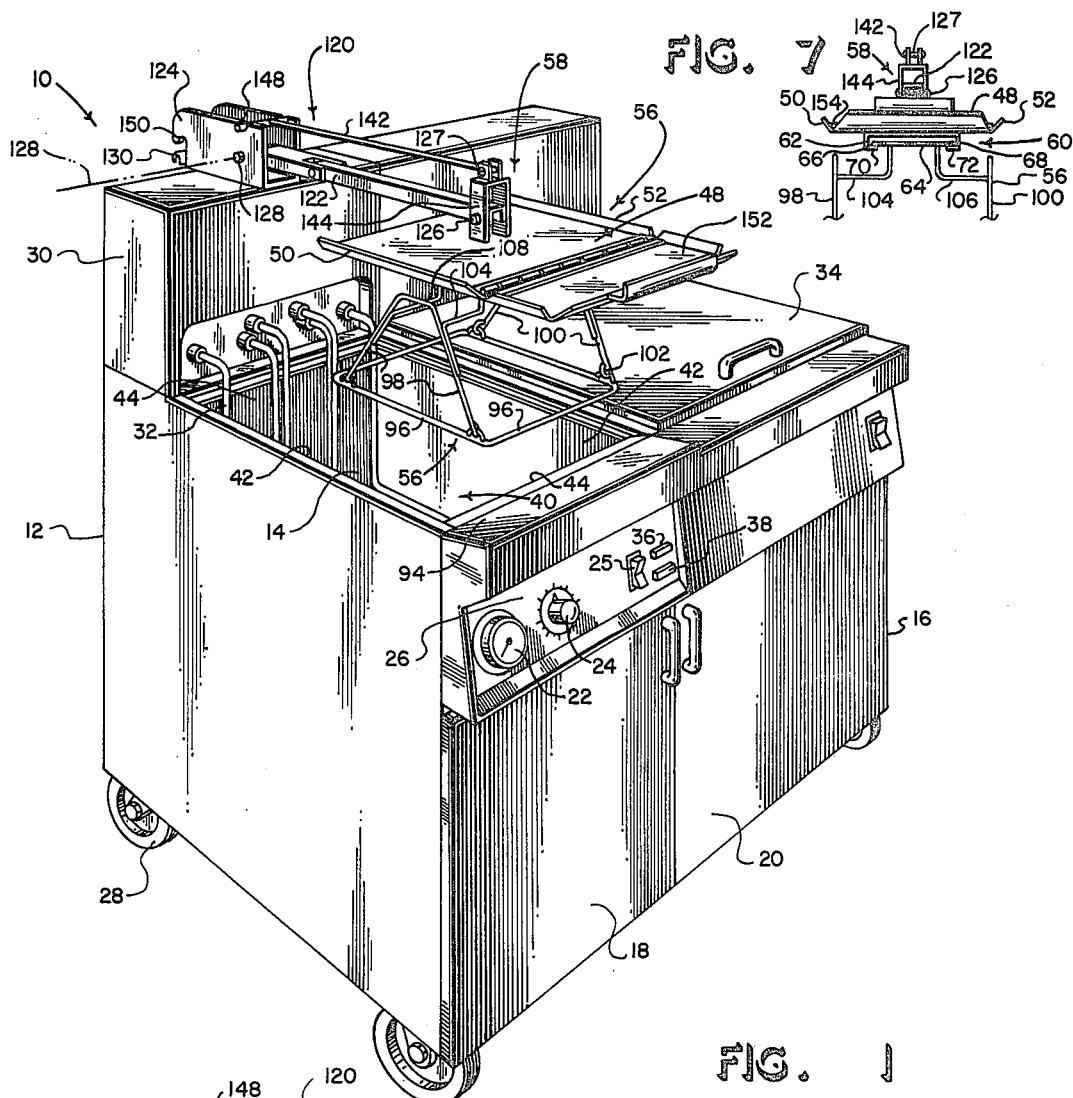
FIG. 1 is a perspective view of a cooking system incorporating the present invention.
FIG. 2 is a left side elevation view of the cooking system of FIG. 1 in combination with a side elevation view of an auxiliary loading platform.
FIG. 7 is a partial elevation view of a portion of the rack handling apparatus taken along the line VII—VII of FIG. 3.

In the description which follows, like parts are marked throughout the specification and drawing with the same reference numerals, respectively. The drawing figures are not necessarily to scale and in some instances portions have been exaggerated in order to more clearly depict certain features of the invention.

For purposes of illustration, the invention will be described in combination with a cooking console having a fry pot in which cooking oil is heated by means of electrical heating elements. However, it should be understood that the various features of the invention may be utilized in combination with a fry pot which is heated by a gas burner.

Referring now to FIG. 1, a cooking system 10 which incorporates the present invention is illustrated. The cooking system 10 includes a free standing console 12 having a fry pot unit 14 and a filter unit 16, preferably of the type disclosed in the co-pending U.S. application Ser. No. 753,936, filed Dec. 23, 1976 and entitled "FILTER SYSTEM FOR FRYING APPARATUS", which is hereby incorporated by reference. Hinged cabinet doors 18, 20 permit access to interior regions of the console 12. A temperature indicating dial 22, a temperature selector control 24 and an on/off switch 25 are conveniently clustered on a front panel portion 26 of the frying unit 12. The fry pot 14 is of the open mouth variety and is preferably integrally formed with the countertop surface of the console 12. The console 12 is supported by rollers or castors 28 in the conventional manner.

A vertically extending panel enclosure 30 projects upward along the back of the console 12 and encloses wiring connections for conventional electrical heating elements 32. The electrical heating elements 32 are preferably made of solid tubular heat conducting material. Alternately, conventional tubular sheets enclosing coils or any other type of heat generating coils may be used. The heating elements 32 may be of the dual control, full on or thermostatically-regulated type. The heating elements and thermostatic controls therefor may be constructed as disclosed and claimed in U.S. Pat. No. 3,870,859, assigned to assignee herein, which is hereby incorporated by reference.

A recessed storage compartment is disposed within the filter unit 16 beneath a stainless steel countertop 34 which is pivotally hinged at the rear to provide access to the storage compartment. This compartment may be used to store a shower apparatus (not shown) for cleaning the fry pot 14. A drain rack (not shown) may also be disposed in the storage compartment to provide a temporary storage area on which prepared food may be placed before or after frying. A suspension plate (not shown) may be attached to the inside face of the paneled enclosure 30 to extend horizontally across the paneled enclosure just above the storage compartment to suspend wire mesh cooking baskets for draining into a drain rack in the storage compartment.

The temperature selector control 24 is mounted on the front of the upper panel 26 for selecting the desired temperature for an operating thermostat (not shown). A heater light 36 indicates the on/off status of the heating elements. The switch 25 serves as the main on/off switch and a high limit light 38 is provided to indicate the shut down of the heater elements because of excessive temperatures.

Figures 4, 5:
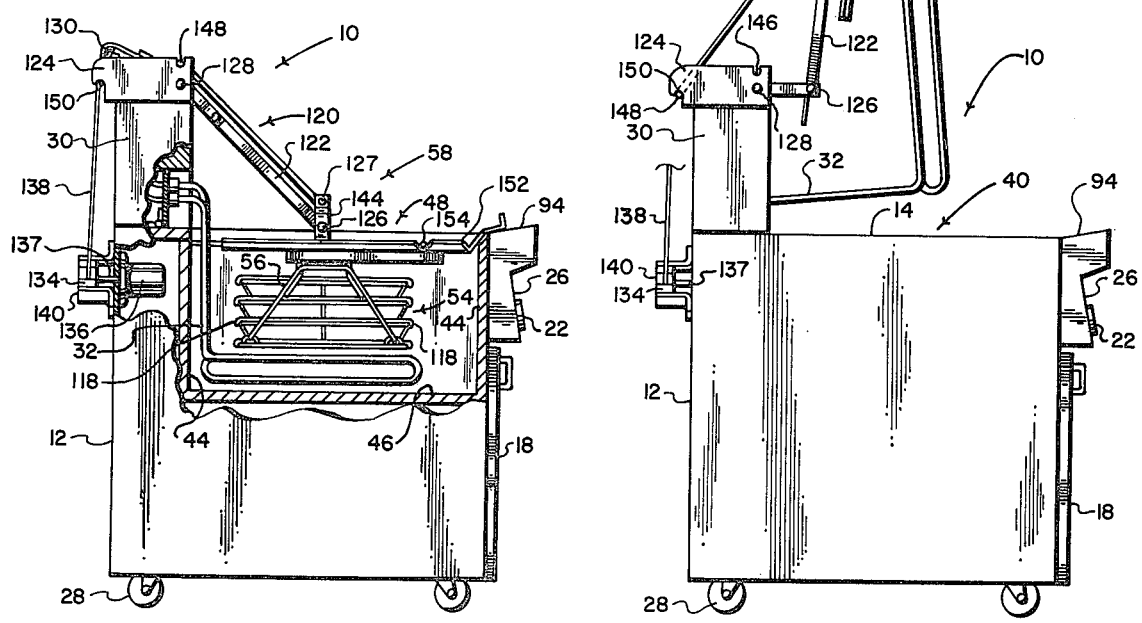
FIG. 4 is a partially cut away side elevation view of the frying system shown in FIG. 1 which illustrates the operation of the cooking system of FIG. 1.
FIG. 5 is a side elevation view of the cooking system shown in FIG. 1 with the rack handling apparatus and heating elements retracted to permit cleaning of the fry pot.

Referring now to FIGS. 1 and 4, the fry pot 14 is a deep fat frying unit provided for cooking food portions such as breaded chicken which comprises an open mouth 40 having side walls 42 joined by end walls 44 and a bottom 46 which in combination define a vat or basin for receiving liquid shortening or cooking oil. A removable cover assembly 48 is provided for partially closing the open mouth 40 of the fry pot 14. The perimeter of the fry pot mouth 14 is integrally formed at the countertop level of the console and is preferably beveled to engage beveled flange portions 50, 52 of the cover 48. This particular configuration of a beveled rim and matching beveled cover is preferred; however, other variations are possible as long as a tight fit is achieved.

According to an important feature of the invention, the cover 48 maintains a steam layer over the frying shortening during a cooking cycle thereby preventing a rapid release of heat and steam vapor moisture to the atmosphere. Although the cover 48 does not provide a vapor tight or pressure tight barrier, the constant generation of steam from the frying food products is capable of replenishing the steam vapor barrier above the frying shortening to the extent that the shortening itself is not exposed to the atmosphere during most or all of the frying cycle. In this way the partial pressure of water vapor in the food products is raised and the natural moisture in the product is heated until it is converted to steam thereby raising the internal temperature of the product being cooked, even though the total pressure remains constant. This reduces the duration of the cooking cycle by some 15% to 20%. For breaded portions of two and one-quarter pound chickens fried at typical temperatures of approximately 325° F., the cooking cycle would normally be 12 to 13 minutes. However, when the chicken or chickens are fried in the fry pot 14 which is enclosed by the cover 48 as shown in FIG. 4, the steam layer generated by moisture liberated from the chicken portions provides a thermal shield, whereby the cooking time is reduced to approximately 10 to 11 minutes rather than the 12 to 13 minutes normally required. The energy required to heat the cooking oil is less because of the shorter cooking time and because the vapor barrier above the frying shortening prevents the radiant loss of heat to the atmosphere and thus makes the entire frying operation more efficient.

Figure 6:
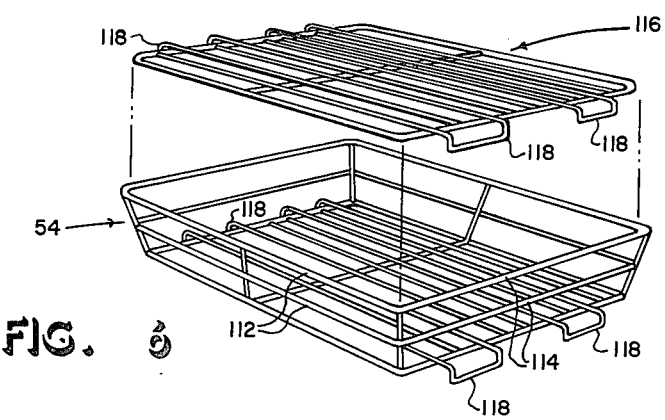
FIG. 6 is a perspective view of a frying rack and cover used for carrying out the objects of the invention.

In conventional fry pots of this capacity, the surface area required to cook a full load of 10 pounds of chicken is approximately 18 inches in width and 18 inches in depth. Because the surface area of the shortening which is exposed to the atmosphere has a direct relationship on the life of the shortening because of aeration or oxidation, the less surface exposed, the longer the life of the frying shortening. According to the present invention, the surface area is substantially reduced to approximately 13 inches in width and 18 inches in depth to receive a vertical stack of frying racks 54 as illustrated in FIGS. 4 and 6. Three frying racks 54 of this size can easily accommodate 10 pounds or more of chicken cut up into conventional serving portions.

In the operation of the invention, the product to be fried, which is normally breaded, is closely spaced on the frying racks 54 in an orderly manner to avoid accidentally stacking one piece on top of the other and to avoid abrading or squeezing the adjacent products. A plurality of these racks 54 are loaded at one time into an open sided basket frame 56 which is detachably engageable with a rack support assembly 58. The rack support assembly 58 is movably suspended with respect to the open mouth 40 of the fry pot 14 and is operable for guiding the frying rack assembly 58 for movement from an elevated position as shown in FIG. 3 above the open mouth 40 of the fry pot wherein the frying rack assembly 54 may be coupled into detachable engagement with the rack support assembly 58 prior to the cooking cycle or withdrawn from coupling engagement with the rack support assembly after completion of the cooking cycle, to a position inside of the fry pot as shown in FIG. 4 wherein food portions previously loaded onto the frying racks 54 are totally immersed in shortening and may be fried during a cooking cycle.

Figure 3:
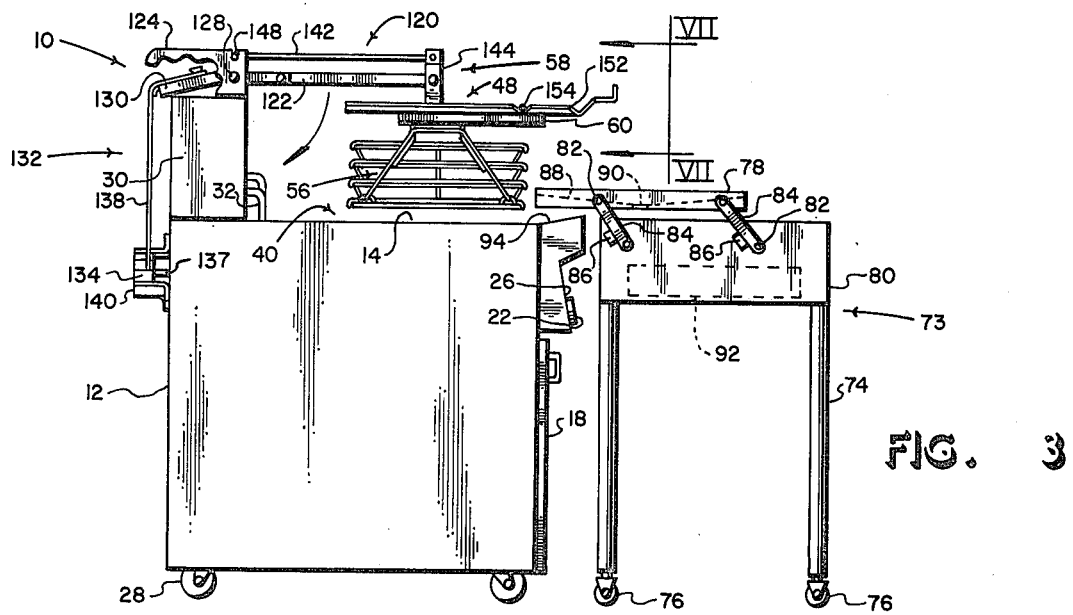
FIG. 3 is a side elevation view similar to FIG. 2 which illustrates the loading procedure of the invention.

Referring now to FIGS. 1, 3 and 7, the rack support assembly 58 is provided with a channel member 60 which has folded edge portions defining an open ended channel 62. The frying rack assembly 55 is provided with a mounting plate 64 having edge portions 66, 68 for engaging corresponding flange portions 70, 72 of the channel member 60. The purpose of this arrangement is to permit the easy insertion of the frying rack assembly 55 into engagement with the rack support assembly 58 either immediately prior to or after the completion of a cooking cycle. According to this arrangement, up to three frying racks 54 each containing food portions which have been previously cut and breaded and arranged in an orderly manner, can be loaded into the open sided basket frame 56 and stored in a refrigerator compartment (not shown) prior to frying. When the need for additional fried portions arises, the frying rack assembly with the vertical stack of previously loaded frying racks may be transported to the console 12 by means of a portable dolly 73 as illustrated in FIG. 2.

Referring now to FIG. 2, the portable dolly 73 is supported on legs 74 and castors 76. The loaded frying rack assembly is supported by means of a movable loading platform 78 which is pivotally mounted to a paneled enclosure 80 by means of pins 82 and pivot bars 84 which are connected to the paneled enclosure and loading platform, respectively, in a pantograph arrangement. Movement of the loading platform 78 from a transit position as shown in FIG. 2 to a loading position as shown in FIG. 3 is limited by stop members 86 which also serve to hold the loading platform in a stable elevated position during loading or unloading of the frying rack assembly 55. When the loading platform 78 is in the elevated position, the frying rack assembly may be loaded directly onto the receiving channel member 60 of the rack support assembly 58. The interior of the loading platform 78 is slightly tapered for directing the flow of shortening that drains from the frying rack assembly 55 through a drain opening 90 into a receiving pan 92 inside of the paneled enclosure portion 80.

The countertop of the console 12 includes an extended portion 94 which is inclined slightly towards the fry pot so that any cooking shortening that drains onto this section will flow into the fry pot. By projecting the loading platform over the inclined countertop surface 94, cooking shortening draining from the finished fried product contained within the frying rack assembly will not drip onto the floor during the unloading operation. All the cooking shortening draining from the fried product will either drain directly into the fryer as the frying rack assembly is suspended above the open mouth 40 of the fry pot unit 14 or will drain directly onto the loading platform 78 and through the drain hole 90 into the drain pan 92 inside of the portable dolly 73. This arrangement promotes cleanliness and conservation of the shortening.

Referring now to FIG. 1, the open sided basket frame 56 of the frying rack assembly 55 preferably comprises a rectangular open bottom portion defined by a folded metal rod 96 and open side portions projecting from the rectangular bottom portion and laterally spaced with respect to each other and formed generally in a triangular outline by folded metal rods 98, 100. The triangular side portions may be joined to the rectangular bottom portion by welding or by loops 102 as shown in FIG. 1. The mounting plate 64 is secured in parallel relation with the rectangular bottom portion by means of offset rod members 104, 106, 108 and 110. All of the folded metal rod members and offset rod members preferably comprise stainless steel and preferably are spot welded for stability.

The open sided basket frame 56 in this embodiment accommodates a stack of three frying racks 54 in the manner shown in FIGS. 2, 3 and 4. The frying racks are of the conventional type having elevated wire side portions 112, 114 defining a receiving area for containing food portions. A rack cover 116 is disposed on top of the uppermost frying rack 54 to confine food portions within the rack and to prevent them from floating away during the cooking cycle. Each frying rack 54 and the cover 116 includes a pair of positioning loops 118 at each end for maintaining alignment of the racks within the basket frame 56 and serve to position one rack on the top of the wire frame of the rack below. This prevents shifting of the frying racks prior to and during the frying cycle.

The rack support assembly 58 includes a pantograph guiding structure 120 from which the cover 48 and frying rack assembly 55 are suspended. The pantograph guiding structure comprises an elongated support bar 122 having a first end portion pivotally attached to an anchor plate assembly 124 about a stationary pivot pin 128, as shown in FIG. 1 of the drawing, a stabilizing bar 142, and a pivot plate 144 which is coupled to the ends of bars 122 and 142 by two pins 126 and 127, respectively. The support bar 122 includes a moment arm portion 130 which is coupled to a drive assembly 132 for causing the support bar to rotate about the pin 128 as the frying rack assembly 55 is inserted into or withdrawn out of the fry pot 14. The drive assembly 132 preferably comprises a sheave assembly 134, and an electric motor 136 having a drive shaft 137 coupled in driving relation with the sheave, and a cable 138 wound about the sheave 134 and attached to the moment arm portion 130. The electric motor 136 is preferably mounted inside of the console 12 with its drive shaft 137 projecting through the rear panel as shown in FIG. 2.

The drive motor 136 is preferably coupled to a timing mechanism (not shown) which may be remotely actuated by an operator for causing the motor to lower and raise the frying rack assembly 55 into and out of the fry pot 14, respectively. Microswitches (not shown) may be incorporated into the drive motor assembly for limiting the downward travel of the frying rack assembly 55. However, the actual downward motion of the assembly will be limited by the engagement of the cover 48 with the periphery of the fry pot. By providing for remote actuation of the drive motor 136, exposure of an operator in the work area immediately surrounding the fry pot is minimized thereby reducing the risk of burn injury due to splashing or splattering of shortening as the food portions are inserted into the pool of hot cooking shortening. After the frying cycle has been completed, the timing mechanism will automatically energize the drive motor 136, which is preferably reversable, for withdrawing the frying rack assembly 55. Withdrawal and unloading of the cooked food product according to this procedure is accomplished in a matter of seconds rather than minutes. All of the product is removed substantially simultaneously as the frying rack assembly is withdrawn and is immediately available to be served after the frying rack assembly has been placed on the loading platform 78 of the portable dolly or onto some other working surface.

It is preferred that the drive motor 136 which controls the raising and lowering of the frying rack assembly be a reversible motor rather than a bell crank motor combination. With a reversible motor, exact upper and lower limits of travel can be achieved with essentially no over travel. The cable 138 is preferably a high strength multistrand flexible wire cable. As previously mentioned, limit switches may control the rotation of the sheave 134 although mechanical stops on the cable 138 might also be provided to actuate the limit switches. The sheave assembly 134 is enclosed within a housing or shroud 140 and is attached to a back panel surface of the console 12. The shroud 140 which houses the sheave assembly preferably has a thin profile and is preferably mounted on the rear panel section of the console 12. According to this arrangement the sheave assembly 140 serves as a wall spacer to promote air circulation between the rear panel of the console and the kitchen wall.

Referring again to FIGS. 1 and 4, the pantograph guiding structure 120 includes a stabilizer bar 142 which is disposed substantially in parallel, vertically spaced relation with the support bar 122. The stabilizer bar 142 is pivotally mounted to the anchor plate assembly 124 and to the rack support assembly 58. The support bar 122 and stabilizing bar 142 are maintained in vertically spaced relation by means of a pivot plate 144 and by means of the anchor plate 124. One end of the stabilizer bar 142 is preferably removably coupled to the anchor plate 124 whereby the rack support assembly 58 may be raised and held in an elevated position to permit easy access to the open mouth of the fry pot 14 for cleaning purposes as shown in FIG. 5. For this purpose, the anchor plate assembly 124 includes an open pivot indenture 146 in which a pivot pin portion 148 rotates during cooking operations. However, during cleaning operations it is desirable to elevate the cover 48 and pantograph guiding structure 120 away from the open mouth of the fry pot to provide access for cleaning. This is accomplished as shown in FIG. 5 by disengaging the pivot pin portion 148 from the open pivot indenture 146 and inserting it in latching engagement with a hooked indenture 150 located on the rear of the anchor plate 124.

The fry pot cover 48 preferably comprises a hinged portion 152 which is pivotally mounted on the main body portion of the cover by means of a hinged assembly 154. In the cleaning position, the hinged portion 152 is folded back as shown in FIG. 5. The hinged portion may also be folded back out of the way during loading and unloading of the frying rack assembly 55 to improve access to the channel member 60. Furthermore, the hinged portion 152 of the fry pot cover may be left in the up position during a cooking operation if it is not desired to have the moisture vapor layer maintained over the frying shortening during the cooking operation.

The pantograph guiding structure 120 provides two important functions. First, it guides the frying rack assembly 55 into and out of the frying pot and stabilizes the movement of the frying rack assembly so that the basket frame 56 and the frying racks 54 within are maintained in a vertical position when moving from one position to the other. In addition, the pantograph structure 120 provides that the frying rack assembly 55 is projected forward toward the operator in the elevated position which improves access to the channel member 60 and thereby makes loading and unloading easier. The frying rack assembly 55 moves generally in a curved path while it is maintained in a vertical orientation which projects it to a slightly overhanging position relative to the sloped countertop portion 94.

The food portions which are to be fried are placed in each of the frying racks 54 in an orderly fashion and the frying racks are loaded into the open sided basket frame 56 in a stacked array so that all of the food portions may be submerged in the frying shortening substantially at the same time. The food portions are prevented from floating away by the bottom strand portions of each frying rack and by the strand portions of the cover 116. The food products are maintained in separate vertically spaced cooking layers when they are enclosed within the vertically stacked frying racks. For a conventional frying rack having dimensions of 13 inches by 18 inches, approximately two head of chicken (16–18 pieces) may be accommodated on each rack. Therefore, it is possible to cook approximately six head of chicken (up to 54 pieces) at one time when using a stacked array of three frying racks, or approximately 50% more food portions than the amount accommodated by a conventional fry pot arrangement, with the volume of frying shortening required being the same or slightly less than that required in the conventional fry pot arrangement. With the reduction in cross-sectional area of the fry pot, the console itself may be smaller, thereby requiring substantially less floor space for cooking the same amount of food portions at one time. Because floor space requirements are reduced, room ventilation requirements are also correspondingly reduced. The surface area of the shortening exposed to the atmosphere is also reduced, thereby reducing aeration and prolonging the life of the shortening. Because all of the food portions may be loaded in the frying shortening substantially simultaneously with only seconds of labor rather than a period of ninety seconds to two minutes required by conventional systems, the cooking time for each portion can be very closely controlled, thereby improving the overall quality of the food portions, and thereby reducing the amount of food particles and bread crumbs which become entrained in the shortening. Because substantially more food portions may be cooked in a relatively shorter cooking interval, service operations can respond more rapidly during peak service periods.

Therefore it will be apparent that the cooking system of the present invention provides substantial advantages over conventional fry pot arrangements and is designed to speed up the frying of bulk quantities of food such as chicken, fish, cutlets and potatoes. The frying apparatus of the present invention requires a minimum amount of floor space, produces high quality, uniformly cooked products regardless of whether the fry pot is fully loaded or not, minimizes energy consumption and facilitates rapid internal and external equipment cleaning and provides a maximum of trouble-free life. Additionally, the entire system provides an improved method of bulk food processing that increases output, reduces the requirement for extensive operator training, reduces operator labor and improves product quality. It further conserves and extends the useful life of shortening which represents a substantial fraction of the overall production cost of the fried product. Finally, these advantages are provided by the apparatus of the invention which also improves operator safety by reducing the risk of burn injury due to splashing and splattering.

Although a preferred embodiment of the invention has been described in detail, it should be understood that various changes, substitutions and alterations can be made therein without departing from the spirit and scope of the invention as defined by the appended claims.

What is claimed is:

1. In frying apparatus of the type including a console and a fry pot mounted on said console having an open mouth for receiving portions of food, the combination with said frying apparatus of a frying rack assembly having portions for maintaining food portions in separate vertical layers and a rack support assembly movably suspended with respect to the open mouth of said fry pot, said rack support assembly and said frying rack assembly having mutually engageable portions permitting detachable coupling arrangement of said frying rack assembly to said rack support assembly, and guiding means coupled to said rack support assembly for guiding said frying rack assembly for movement from an elevated position above the open mouth of said fry pot wherein the frying rack assembly may be engaged or disengaged from said rack support assembly prior to or after completion of a cooking cycle, respectively, to a position inside of said fry pot wherein food portions contained within the frying rack assembly may be fried during a cooking cycle, said guiding means comprising an elongated support bar having a first end portion pivotally coupled to said console about a fixed axis of rotation and a second end portion pivotally coupled to said rack support assembly, and drive means coupled to said support bar for causing said support bar to rotate about its fixed axis through a vertical plane relative to said console as said frying rack assembly is inserted into or withdrawn out of said fry pot.

2. The combination as defined in claim 1, said support bar including a moment arm portion projecting from said fixed axis, and said drive means comprising a sheave, an electric motor coupled in driving relation to said sheave, and a cable having a first end portion wound about said sheave and a second end portion attached to said moment arm portion.

3. The combination as defined in claim 1, including a stabilizer bar disposed substantially in parallel, vertically spaced relation to said support bar, said stabilizer bar having a first end portion pivotally coupled to said console and a second end portion pivotally coupled to said rack support assembly.

4. The combination as defined in claim 3, said support bar comprising a base portion pivotally coupled to said console and an extension arm portion having a first end portion pivotally coupled to said base portion and a second end portion pivotally coupled to said rack support assembly, the first end of said stabilizer bar being removably coupled with respect to its fixed rotational axis on said console, and including stop means carried by said console for limiting rotation of said base portion of said support bar, whereby said rack support assembly and the extension arm of said support bar can be raised and supported in an elevated position above the fry pot to permit cleaning thereof by disengaging the first end of said stabilizer bar from its fixed rotational axis location and establishing latching engagement of the first end of said stabilizer bar at a new location on said console which corresponds with the desired cleaning position.

5. In frying apparatus of the type including a console and a fry pot mounted on said console having an open mouth for receiving portions of food, the combination with said frying apparatus of a frying rack assembly having portions for maintaining food portions in separate vertical layers and a rack support assembly movably suspended with respect to the open mouth of said fry pot, said rack support assembly and said frying rack assembly having mutually engageable portions permitting detachable coupling engagement of said frying rack assembly to said rack support assembly, and guiding means coupled to said rack support assembly for guiding said frying rack assembly for movement from an elevated position above the open mouth of said fry pot wherein the frying rack assembly may be engaged or disengaged from said rack support assembly prior to or after completion of a cooking cycle, respectively, to a position inside of said fry pot wherein food portions contained within the frying rack assembly may be fried during a cooking cycle, a fry pot cover carried by said rack support assembly for partially sealing the open mouth of said fry pot when said rack support assembly is fully inserted into said fry pot, said fry pot cover defining a thermal barrier and maintaining a steam layer over a pool of cooking oil in the fry pot as portions of food are fried thereby preventing rapid release of heat and steam vapor to the atmosphere, said fry pot cover comprising a main body portion and a portion pivotally connected to the main body portion which can be rotated to a position overlying the main body portion of the cover to increase access to the rack support assembly during engagement or disengagement of said frying rack assembly.

6. In frying apparatus of the type including a console and a fry pot mounted on said console having an open mouth for receiving portions of food, the combination with said frying apparatus of a frying rack assembly including a plurality of separable frying racks each having top and bottom grills for maintaining food pieces in a horizontal layer and basket means for supporting a vertical stack of frying racks, a rack support assembly movably suspended with respect to the open mouth of said fry pot, said rack support assembly and frying rack assembly having mutually engagable portions permitting detachable coupling engagement of said frying rack assembly to said rack support assembly, and guiding means coupled to said rack support assembly for guiding said frying rack assembly for movement from an elevated position above the open mouth of said fry pot wherein the frying rack assembly may be engaged or disengaged from said rack support assembly prior to or after completion of a cooking cycle, respectively, to a position inside of said fry pot wherein food portions contained within the frying rack assembly may be fried during a cooking cycle, said guiding means comprising an elongated support bar having a first end portion pivotally coupled to said console about a fixed axis of rotation and a second end portion pivotally coupled to said rack support assembly, and drive means coupled to said support bar for causing said support bar to rotate about its fixed axis through a vertical plane relative to said console as said frying rack assembly is inserted into or withdrawn out of said fry pot.

7. The combination as defined in claim 6, said support bar including a moment arm portion projecting from said fixed axis, and said drive means comprising a sheave, an electric motor coupled in driving relation to said sheave, and a cable having a first end portion wound about said sheave and a second end portion attached to said moment arm portion.

8. The combination as defined in claim 6, including a stabilizer bar disposed substantially in parallel, vertically spaced relation to said support bar, said stabilizer bar having a first end portion pivotally coupled to said console and a second end portion pivotaly coupled to said rack support assembly.

9. The combination as defined in claim 8, said support bar comprising a base portion pivotally coupled to said console and an extension arm portion having a first end portion pivotally coupled to said base portion and a second end portion pivotally coupled with respect to its fixed rotational axis on said console, and including stop means carried by said console for limiting rotation of said base portion of said support bar, whereby said rack support assembly and the extension arm of said support bar can be raised and supported in an elevated position above the fry pot to permit cleaning thereof by disengaging the first end of said stabilizer bar from its fixed rotational axis location and establishing latching engagement of the first end of said stabilizer bar at a new location on said console which corresponds with the desired cleaning position.

10. The combination as defined in claim 6, including a fry pot cover carried by said rack support assembly for partially sealing the open mouth of said fry pot when said rack support assembly is fully inserted into said fry pot, said fry pot cover defining a thermal barrier and maintaining a steam layer over a pool of cooking oil in the fry pot as portions of food are fried thereby preventing rapid release of heat and steam vapor to the atmosphere.

11. The combination as defined in claim 6, said fry pot cover comprising a main body portion and a portion pivotally connected to the main body portion which can be rotated to a position overlying the main body portion of the cover to increase access to the rack support assembly during engagement or disengagement of said frying rack assembly.

12. Frying apparatus comprising
 a console;
 a fry pot housed in said console and having an open top;
 frying rack assembly means lowerable into the fry pot;
 support means for detachably engaging and supporting the frying rack assembly means, the frying rack assembly means being disengagable from the support means by horizontal movement from over the fry pot;

means for moving the support means between (a) a raised position where the frying rack assembly means when supported by the support means is disposed above the fry pot and can be moved to disengage from the support means, and (b) a lowered position where the frying rack assembly means suspended from the support means is disposed in the fry pot;

the frying rack assembly means comprising a plurality of frying racks each separable one from the other, each frying rack including bottom and top grills and means spacing the grills a distance apart to accommodate only a layer of food pieces, and basket frame means supporting a plurality of said vertically stacked frying racks, the basket frame means being disengagably suspended from the support means; and cart means for transporting a frying rack assembly, the cart means including secondary support means movable from a transport position on the cart to an extended position in which said secondary support means is adjacent the bottom of a frying rack assembly means when said frying rack assembly means is in the raised position, such that as the frying rack assembly means is moved to disengage from the first mentioned support means, it can be moved onto and supported by the secondary support means.

13. The frying apparatus of claim 12 wherein the secondary support means includes means for catching cooking oil dripping from food pieces in the frying rack assembly as the frying rack assembly is moved onto and supported by the secondary support means.

* * * * *